UNITED STATES PATENT OFFICE.

HEINRICH ASCHERMANN, OF CASSEL, GERMANY.

PROCESS OF SIMULTANEOUSLY PRODUCING CARBIDS AND METALS OR ALLOYS.

SPECIFICATION forming part of Letters Patent No. 612,694, dated October 18, 1898.

Application filed March 30, 1898. Serial No. 675,754. (No specimens.)

*To all whom it may concern:*

Be it known that I, HEINRICH ASCHERMANN, a subject of the King of Prussia, German Emperor, residing at No. 5 Terasse, in Cassel, in the Kingdom of Prussia, German Empire, have invented a new and Improved Process of Simultaneously Producing Carbids and Metals or Alloys, of which the following is a specification.

My invention relates to electrometallurgical processes, and particularly to the treatment of ores (generally oxids) in the electric furnace. It has constantly been the aim of chemists and manufacturers to reduce the amount of electrical energy necessary to bring about the desired reactions. Thus the addition of the sulfid of a metal has proved to be a very effective means of accomplishing a saving of electrical energy.

I have secured a further saving of electrical energy and at the same time the simultaneous production of carbids by adding a sufficient quantity of carbon to a mixture of an oxid of one metal and a sulfid of a different metal, whereupon under the action of the electric current the carbon will combine with the metal having the greater affinity therefor, while the other metal will be reduced to the metallic state. If non-volatile, this metal will sink to the bottom of the molten mass. If the metal is volatile, it will form vapors which can be collected and condensed according to well-known methods.

My invention therefore consists in mixing an oxid and a sulfid, the bases of which have a different affinity for carbon, with carbon and heating the mixture electrically. If, for instance, a mixture containing the ingredients in about the quantities indicated by theory of iron pyrites and lime and carbon is treated in an ordinary electrical furnace, there is obtained as one product pure metallic iron and as the other product carbid of calcium, which yields acetylene of the same purity as that given off by the carbid of calcium produced in the usual way, while the consumption of current is at least forty per cent. less.

The practical value of the invention is obvious. It adds to the saving in the consumption of current the production of the valuable carbids without any other additional expenditure than the cost of the carbon, and thus the reduction, especially of the natural sulfids of technically valuable metals, is made a greatly advantageous process, also in an economical respect.

In an analogous manner to that in the example aforegiven the invention may be carried out with all oxids (or as their equivalents other oxygen compounds, such as carbonates) capable of forming carbids, as well as with natural and artificial sulfids of metals, if such sulfids are capable of decomposition in the electric furnace. Finally, it will be readily understood that by simultaneously employing several oxids or sulfids alloys instead of single metals may be obtained.

The reaction in the case of treating a mixture of iron pyrites, ($FeS_2$,) lime, ($CaO$,) and carbon, ($C$,) as above described, presumably takes place according to the equation $$FeS_2 + 4CaO + 8C = Fe + 4CaC_2 + 2SO_2,$$

or, with limestone instead of lime, $$3FeS_2 + 4CaCO_3 + 8C = 3Fe + 4CaC_2 + 6SO_2.$$

Having now described my invention, that what I wish to secure by Letters Patent is—

The process for simultaneously producing metals and carbids, consisting in mixing carbon with an oxygen compound and a sulfid of metals having different affinities for carbon, and heating the mixture electrically, as set forth.

In witness whereof I have hereunto signed my name in the presence of two subscribing witnesses.

HEINRICH ASCHERMANN. [L. S.]

Witnesses:
HERMANN MENCHE,
TAKOL BETTENHÄUSER.